Aug. 30, 1966  M. BERKOWITZ  3,270,321
SELECTIVE DATA SAMPLING SYSTEM
Filed Feb. 2, 1962  7 Sheets-Sheet 1

Fig.1

INVENTOR.
MILTON BERKOWITZ
BY
Henry W. Kaufmann
AGENT

Fig.2

Aug. 30, 1966  M. BERKOWITZ  3,270,321
SELECTIVE DATA SAMPLING SYSTEM
Filed Feb. 2, 1962  7 Sheets-Sheet 3

INVENTOR.
MILTON BERKOWITZ
BY
Henry W. Kaufmann
AGENT

INVENTOR.
MILTON BERKOWITZ
BY
Henry W. Kaufmann
AGENT

Aug. 30, 1966    M. BERKOWITZ    3,270,321
SELECTIVE DATA SAMPLING SYSTEM
Filed Feb. 2, 1962    7 Sheets-Sheet 6

INVENTOR.
MILTON BERKOWITZ
BY
Henry W. Kaufmann
AGENT

INVENTOR.
MILTON BERKOWITZ
BY
Henry W. Kaufmann
AGENT 3,270,321
SELECTIVE DATA SAMPLING SYSTEM
Milton Berkowitz, King of Prussia, Pa., assignor to General Electric Company, a corporation of New York
Filed Feb. 2, 1962, Ser. No. 170,591
8 Claims. (Cl. 340—147)

This invention relates to data-processing and, in particular, to a data-sampling system for use with data-processing apparatus.

In data-processing systems, the number of data sources which it is desirable to monitor or the quantity of data to be handled often exceeds the capacity of certain components of the system. For example, in an airborne, data-gathering system, the data capacity of the telemetry radio link may be limited due to space, weight, or power limitations imposed by the flight vehicle. Thus, it is desirable that the data capacity of the system not be circumscribed by the limitations of a particular system component. This invention is concerned with a data-sampling system for use with such data-processing apparatus.

It is an object of the invention to provide a data-sampling apparatus which serves to increase the capacity of a data-handling system.

It is an object of the invention to provide a data-sampling system capable of distinguishing data variations which meet a prescribed criterion from those which do not.

It is another object of the invention to provide data-sampling apparatus, including at least two sources of data signals, which normally applies the output data from one source to an associated data-handling system and alternately applies the output data from the other source to the system when the latter data changes a predetermined amount, or at a predetermined rate, to thereby better exploit the capacity of the data-handing system.

It is another object of the invention to provide data-sampling apparatus, including at least two sources of data signals, which normally applies the output data from the second source to an associated data utilizing system and alternately supplies the output data from the first source to the data utilizing system when the latter data changes by a predetermined amount or at a predetermined rate, and which automatically reverts to transmission of the output data from the second source to the utilizing apparatus when the output data from the first source ceases to change by the predetermined amount or at the predetermined rate.

It is a further object of the invention to provide a data-sampling apparatus which normally applies the output data from the second of two sources to an associated data handling system, and alternately applies the output data from the first source when the latter data changes a prescribed amount, and which incorporates timing means to periodically apply output data from the first source to the data-handling system for a prescribed time, even though the latter data has not changed the prescribed amount.

It is another object of the invention to incorporate in such a selective data-sampling system an identification means to facilitate distinguishing between data of different priority in the data-processing system.

In the system, as described, one group of data signals has arbitrarily been designated the primary group while the other group of data signals has been designated the secondary group. The data signals from the secondary group, termed secondary data signals, are normally transmitted to the data utilizing apparatus while the data signals from the primary group, termed primary data signals, are only transmitted when they have changed in a prescribed manner. However, the primary date signals are priority signals because, when they change in the prescribed manner, they take precedence over the secondary data signals, irrespective of the changes experienced by the secondary data signals.

In accordance with the illustrated embodiment of the invention, the selected transmission of data signals from a plurality of sensing means, or sensors, to a utilizing means is effected by interposition of a controllable gate. The data signals from the plurality of sensors are segregated into two groups which are applied to the controllable gate, one of the groups being assigned priority. The non-priority group of secondary data signals is normally continuously passed to the utilizing means subject to interruption by the priority group of primary data signals. The primary data signals are also applied to a detection means which senses the amount of change from a previously transmitted value experienced by a given primary data signal. Upon detection of a pre-established change in a primary data signal, the detection means exercises control over the gate and causes it to terminate the normal passage of secondary signals and commence passage of the primary data signal to the utilizing means. (As will appear hereinafter in the description of a specific embodiment of my invention, the terms pre-established or predetermined change mean *any* change whose absolute value is greater than a selected minimum value, and are not confined to a single particular value.) When next a primary data signal occurs which has not changed by a predetermined amount, the gate, under control of the detection means, re-establishes the normal passage of the secondary data signal to the utilizing means. In addition, identification of the type of data, primary or secondary, is effected by superimposing an identifying characteristic on the data signals. Provision is made for periodically applying the primary data signals to the utilizing means irrespective of variations in the primary data signals. In practicing the invention it will occur to those skilled in the art that the concept may be applied to a variety of arrangements, depending upon the requirements of the particular data-handling system, and that the broad principles of the invention apply irrespective of the particular arrangement employed.

The subject matter of the invention is particularly pointed out and distinctly claimed in the concluding portion of the specification. The invention, however, both as to organization and method of operation, may best be understood by reference to the following description taken in connection with the accompanying drawings in which:

Figure 1:
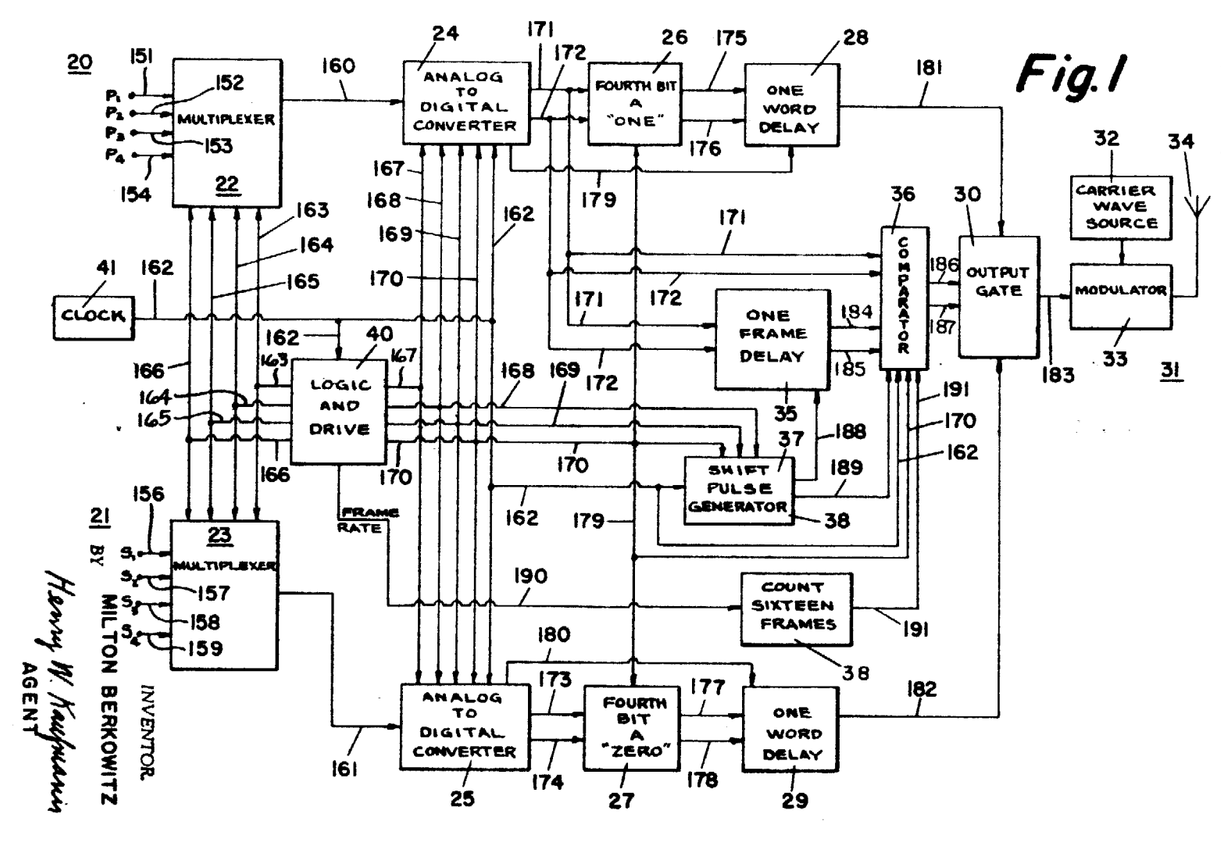
FIG. 1 is a block diagram of the data-sampling system in accordance with the invention.

With reference to FIG. 1, reference numeral 20 indicates a first, or primary, group of data sensors $P_1$, $P_2$, $P_3$ and $P_4$ while reference numeral 21 indicates a second, or secondary, group of data sensors $S_1$, $S_2$, $S_3$ and $S_4$. The number of data sensors is not limited to four, as shown, but may be any number as required. The data sensors, which may be transducers, e.g., thermocouples, strain gauges or the like, produce analog voltage signals representative of monitored or measured functions. The data signals are designated primary and secondary, in accordance with their importance or other appropriate criteria. As will be explained in detail later, the signals designated primary are priority signals and, when they are changing by significant amounts from their previously considered values, take precedence over the secondary signals irrespective of the changes experienced by the secondary data signals. The division or classification of signals can be made into more than two groups, depending upon the system requirements, with corresponding alteration of the remainder of the data-sampling system of the invention, as will be obvious to those skilled in the art. The purpose of the segregation is to increase the data-gathering capabilities of a given system, which may, when used conventionally, have capacity limitations.

In the embodiment shown in the drawing, the collected data is transmitted to a ground receiver by means of a telemetry radio link, such as may be used in space vehicle applications. Heretofore the data handling capability of such a system has been limited by the power-bandwidth limitations of the telemetry radio link, imposed, for example, by weight or space limitations in the space vehicle. In the system of the invention, constant system bandwidth is utilized to transmit more information by selectively transmitting either the primary or the secondary data signals. The data-sampling system of the invention is also applicable to uses other than radio transmission of flight data, e.g. data monitoring of a manufacturing process.

As represented in FIG. 1, analog signal voltages are applied, by means of lines 151, 152, 153, 154, and 156, 157, 158, 159 to multiplexer 22 and multiplexer 23 respectively. Multiplexer 22, comprising an analog gate matrix, sequentially applies the data signals of group 20 to analog-to-digital converter 24 by means of line 160. Converter 24 produces digital signals representative of the applied analog signals and hence of the functions being measured or monitored. A digital data signal output of analog-to-digital converter 24, representing digitally the sampled output of a given data sensor, i.e. one item of data, comprises a four bit binary code signal termed a "word." Multiplexer 22 periodically repeats the sequential application of the group 20 analog data signals to converter 24, the time interval between successive applications of the signal from a given sensor being termed a "framed period." Similarly, multiplexer 23 sequentially and periodically applies the analog data signals of group 21 to analog-to-digital converter 25 by means of line 161 to thereby produce a series of digital data signals, i.e. four bit binary words, representative of the functions sensed by the group 21 sensors.

The output of analog-to-digital converter 24 at a given time comprises an information signal P-"1" or its complement P-"0" while the output of analog-to-digital converter 25 comprises an information signal S-"1" or its complement S-"0." Although the information of interest is adequately represented by the presence or absence of the P-"1" and S-"1" signals, the complementary signals are required for the proper operation of the comparator and of the shift registers incorporated in the delay units of the system to be described.

Logic and drive unit 40 synchronizes and controls the multiplexes 22 and 23 and the analog-to-digital converters 24 and 25 in the following manner. Clock 41 produces a reference frequency signal which is applied to logic and drive unit 40 by means of line 162 and utilized by the logic and drive unit 40 to produce synchronization and control pulses. The frequency of the signal produced by clock 41 thereby controls the sampling rate of the data-sampling system of the invention. The reference frequency established by clock 41, which may be any of a variety of oscillators known in the art, may be, for example, 1,000 cycles per second. The multiplexer synchronization and control signals, whose time relationships are represented in FIG. 2a, $X_1$, $X_2$, $X_3$ and $X_4$ are applied to multiplexers 22 and 23 by means of lines 163, 164, 165, and 166, respectively, while the analog to digital converter synchronization and control signals $Y_1$, $Y_2$, $Y_3$ and $Y_4$ are applied to converters 24 and 25 by means of lines 167, 168, 169 and 170, respectively. In the drawings, for purposes of simplicity, the reference number applied to a connecting line will apply to all associated lines carrying the same signal.

To eliminate the possibility that misinterpretation of primary and secondary data may occur by confusion between the primary and secondary data signals transmitted from the data-sampling system of the invention, means are provided for identifying as such each of the primary and secondary digital signals representative of the outputs of the respective sensors. As noted previously, the sampled output of each data sensor is converted to a four-bit word. In the embodiment shown, the desired distinction is accomplished by modifying the fourth, least significant, bit of each of the encoded signals derived from the analog-to-digital converters 24 and 25, the encoded signals being representative of each signal from each primary and secondary data sensor. Identification unit 26, designated fourth-bit-a-"one," identifies each of the primary digital data signals by changing the fourth bit of each *primary* digital data signal to a "1" if it is not already one. Similarly, identification unit 27 in the secondary data channel, designated fourth-bit-a-"zero," changes the fourth bit of each *secondary* digital data signal to a "0." Identification may be effected in many other ways which will be evident to those skilled in the art, e.g., the primary and secondary data signals may be identified by adding a fifth characteristic bit to each four bit data word, thereby obviating the change in the fourth bit. The primary digital data signals, comprising an information signal P-"1" or its complement P-"0," are applied to identification unit 26 by means of lines 171 and 172 respectively while the secondary digital data signals, comprising an information signal S-"1" or its complement S-"0," are applied to identification unit 27 by means of lines 173 and 174, respectively.

The digital data signal outputs of identification units 26 and 27 are applied to one word delay or storage units 28 and 29, respectively, by means of lines 175, 176, and 177, 178 as represented. The delay units 28 and 29 serve to store a given digital data signal, or word, for a period equivalent to the time required to sample the output of a given data sensor. The purpose for this delay will be apparent from the subsequent description of the comparison operation. Control and synchronization of the delay units is effected by inverted clock signals produced by the respective analog to digital converters 24 and 25 and applied respectively to delay unit 28 via line 179 and to delay unit 29 by means of line 180.

The delayed primary and secondary digital data signals are applied to output gate 30 over lines 181 and 182 respectively. As shown, only the P–"1" and S–"1" digital signals are applied to the output gate. The complementary signals P–"0" and S–"0," as previously described, are provided for the proper operation of the comparator unit and of the shift registers incorporated in the delay units, the desired information being represented wholly by the P–"1" and S–"1" signals. Output gate 30 is selectively operative to pass the secondary digital data signals, normally, or alternatively to pass the primary digital data signals to telemetry transmitter 31 over line 183 when the priority of the primary signals is established as will be more fully described. Transmitter 31 comprises carrier wave source 32, modulator 33, and antenna 34. Any data-handling or processing means may be utilized to receive and operate upon the output of the data-sampling system of the invention but transmitter 31 is represented for completeness.

The primary digital data signals P–"1" and their complementary signals P–"0" are also applied to one-frame-delay unit 35 and comparator 36 over lines 171 and 172, respectively, as shown in the drawing. A primary digital data signal, i.e. a four bit word representing the sampled output of a given primary sensor, applied to delay unit 35 is delayed one frame period and then applied to comparator 36 over lines 184 and 185, simultaneously with the application of a contemporary primary digital data signal, or word, representing the instantaneous sampled output of the same data sensor, over lines 171 and 172. Thus, the comparator 36 simultaneously receives a contemporary data signal output of a particular primary sensor and data signal output of the same sensor one "frame" past and is able to compare the two consecutively sampled outputs of the particular data sensor, as represented by four bit words.

Shift pulse generator 37 produces a series of pulses to control the shift registers of the one frame delay unit 35 and to control the comparison operation in comparator 36, as described in detail later in the specification. The shift pulse generator 37 receives inputs from the clock 41 and logic and drive unit 40 over lines 162, 168, 169, and 170. The outputs of the shift pulse generator are applied to one-frame-delay unit 35 over line 188 and to 36 over line 189. The comparator 36 also receives inputs from clock 41 and logic and drive unit 40 over lines 162 and 170 respectively.

The comparator 36, through lines 186 and 187, controls the output gate 30 so as to pass either the primary or the secondary data signal to transmitter 31 in accordance with the results of the comparison. If the primary data signal has not changed by a prescribed amount, preset into the comparator, the comparator generates an "enable S" signal which is applied to output gate 30 over line 187. This control signal serves to bias the gate so that the secondary digital data signal applied thereto is passed to transmitter 31. If the primary digital data signal has changed by a prescribed amount, thus establishing priority for the primary signal, an "enable P" signal is generated by comparator 36 and applied to output gate 30 over line 186, thereby conditioning output gate 30 to allow the primary digital data signal to pass to the transmitter while the secondary digital data signal is blocked. This priority is exercised only for the duration of a given primary data signal from a particular primary sensor, $P_1$, $P_2$, $P_3$, or $P_4$, that has changed a significant amount, following which the secondary digital data signals are again passed by the output gate 30.

Since, for a given application, the primary data may not change for an extended period of time, it is desirable to periodically sample the primary data to monitor the proper functioning of the space vehicle and the data-sampling system. Hence, provision is made for periodically transmitting a complete frame of primary data. To this end, count-sixteen-frames unit 38, driven by logic and drive unit 40 over line 190, is provided. Count unit 38 periodically produces an over-ride "read P" signal, having a duration of one "frame period" which is applied to comparator 36 over line 191. The override signal causes the comparator 36 to generate an "enable P" signal having a duration of one "frame period," thereby allowing output gate 30 to pass the primary data and block the secondary data for a time necessary to pass one complete frame of primary data. A frame includes one sampled output of each primary data sensor in group 20.

As previously discussed, to eliminate the possibility that a misinterpretation of primary and secondary data may occur due to confusion between the primary and secondary data signals transmitted from the data-sampling system, it is desirable to provide means for identifying the type of signal being transmitted and this will be more fully described in connection with the fourth-bit-a-"one" circuit 26 and the similar fourth-bit-a"zero" circuit 27. Alternatively to the inclusion of an identifying bit in each digital data signal from each sensor, distinction may be accomplished by judicious arrangement of the primary and secondary data sensors so that the signals generated thereby are distinguishable on the basis of anticipated signal amplitudes.

Figure 2:
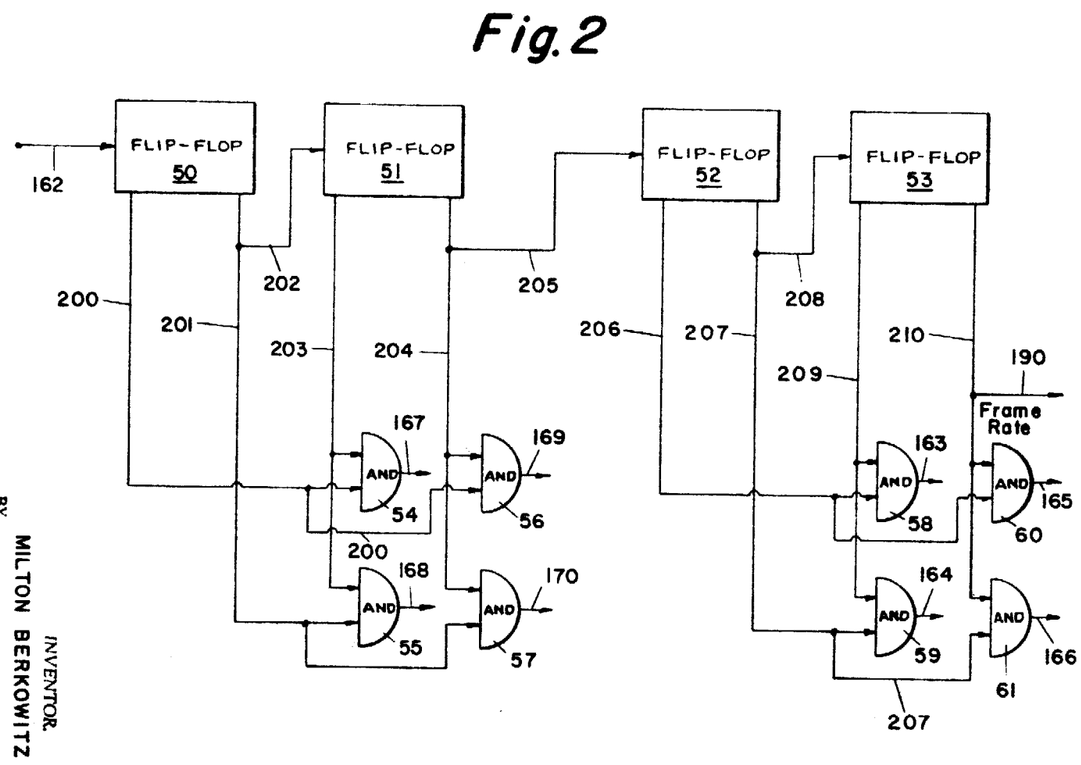
FIG. 2 is a block diagram of the logic and drive unit of the system of FIG. 1.
Figure 2A:
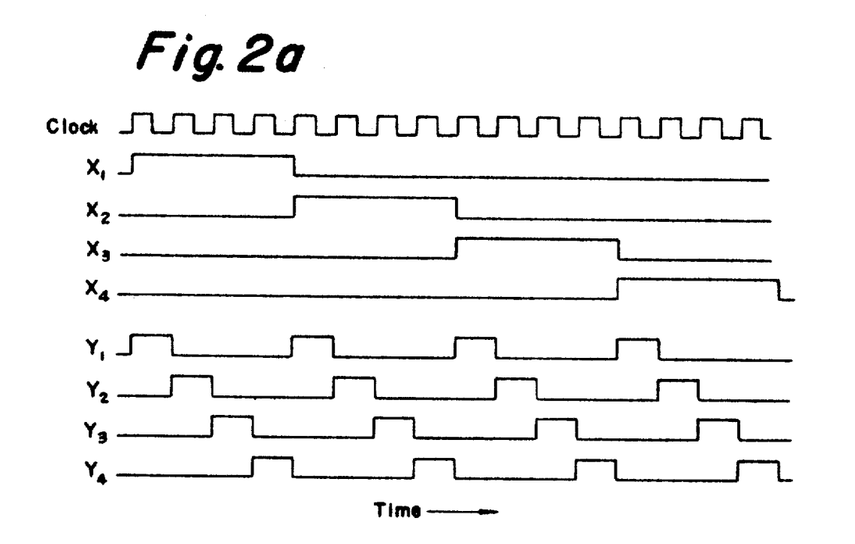
FIG. 2a is a diagram showing the pulse width and timing relationship of the logic and drive unit output signals.

FIG. 2 depicts in detail the logic and drive unit 40 shown in the block diagram of FIG. 1. The unit comprises a plurality of conventional flip-flops and gates as shown. Flip-flops 50, 51, 52 and 53 form a frequency dividing circuit driven by the clock signal from clock 41 on line 162. As noted previously, the clock frequency may be any desired frequency compatible with the requirements of the system and the system components. The design frequency of the embodiment shown is 1,000 c.p.s.

The clock input to flip-flop 50, on line 162, causes flip-flop 50 to change its state in synchronism with the clock signal and at the same frequency as the clock signal. The outputs of flip-flop 50 are applied to AND gates 54, 55, 56 and 57 over lines 200 and 201. Flip-flop 51 is driven by flip-flop 50 over line 202 connected to output line 201 of flip-flop 50. Flip-flop 51 changes its state at half the frequency of flip-flop 50 and the outputs of flip-flop 51 are applied to AND gates 54, 55, 56 and 57 over lines 203 and 204.

AND gate 54 thus produces one output pulse, $Y_1$ for every four clock pulses as do gates 55, 56 and 57. The output of AND gates 54, 55, 56, and 57, viz. signals designated for convenience as $Y_1$, $Y_2$, $Y_3$, and $Y_4$, respectively, are produced sequentially. The width of pulses $Y_1$, $Y_2$, $Y_3$ and $Y_4$, termed bit pulses, is twice that of the clock pulses, as shown in FIG. 2a. The reason for the production of pulses of twice the width of the clock pulse is, very briefly (for the counter system of FIG. 2 is well known in the art of data-processing), that the flip-flop 50 changes its state only when the leading edge of a positive-going pulse is received from clock 41, and so remains in a given state for the duration of a positive clock pulse and also for the duration of the ensuing zero or negative portion of the clock output. As previously described with reference to FIG. 1, bit pulses $Y_1$, $Y_2$, $Y_3$, and $Y_4$ are applied to analog to digital converters 24 and 25 over lines 167, 168, 169, and 170, respectively.

Flip-flop 52 is driven by flip-flop 51 over line 205 connected to the output line 204 of flip-flop 51. The frequency of flip-flop 52 is one-half that of flip-flop 51 and so one-fourth that of the clock. The outputs of flip-flop 52 are applied to AND gates 58, 59, 60, and 61 over lines 206 and 207. Flip-flop 53 is driven by flipop 52 over line 208 connected to the output line 207 of flip-flop 52. The frequency of flip-flop 53 is one-half that of flip-flop 52 and thus one-eighth of that of the clock. The outputs of flip-flop 53 are applied to AND gates 58, 59, 60, and 61 over lines 209 and 210. Thus, AND gates 58, 59, 60, and 61 each produce, in sequence, one pulse for every 16 clock pulses, viz pulses conveniently designated, respectively, as $X_1$, $X_2$, $X_3$, and $X_4$. The width of pulses $X_1$, $X_2$, $X_3$, and $X_4$, termed word pulses, is eight times that of the clock pulses, and four times that of the bit pulses $Y_1$, $Y_2$, $Y_3$, and $Y_4$. Word pulses $X_1$, $X_2$, $X_3$, and $X_4$ are applied to multiplexers 22 and 23 over lines 163, 164, 165, and 166 respectively. Thus by virtue of the four to one width relationship between word pulses $X_1$, $X_2$, $X_3$, and $X_4$ and bit pulses $Y_1$, $Y_2$, $Y_3$, and $Y_4$, as shown in FIG. 2a, the synchronization and control function of logic and drive unit 40 is effected. The application of the word pulses $X_1$, $X_2$, $X_3$, and $X_4$ to multiplexer 22 over lines 63, 164, 165, and 166 respectively, causes the multiplexer to connect the sensors $P_1$, $P_2$, $P_3$, and $P_4$ in sequence to the analog-to-digital converter 24, the output of each sensor being applied to the converter for a time period equal to the width of a word pulse. During this period, four bit pulses $Y_1$, $Y_2$, $Y_3$, and $Y_4$ are applied to analog-to-digital converter 24 over lines 167, 168, 69, and 170 respectively, causing analog-to-digital converter 24 to operate upon the sensor output to produce a four bit data signal or word. Hence, one four-bit digital data word, representing the output of a given sensor during a sampling, is produced for every four clock pulses. All of the sensor inputs $P_1$, $P_2$, $P_3$, and $P_4$ to multiplexer 22 are sampled during the period required for 16 clock pulses to occur. For a clock frequency of 1,000 cycles per second, the frame period is thus 16 milliseconds. The operation of multiplexer 23 and analog-to-digital converter 25 is analogous.

The frame rate output on line 190, connected to output line 210 of flip-flop 53, is a signal occurring once every 16 clock pulses. This frame rate signal is applied to count-sixteen-frames-unit 38 (to be subsequently described with reference to FIG. 11). The bit pulses $Y_2$, $Y_3$, and $Y_4$ are also applied to shift pulse generator 37 over lines 168, 169, and 170 respectively. The shift pulse generator 37 is described in detail with reference to FIG. 10.

Figure 3:
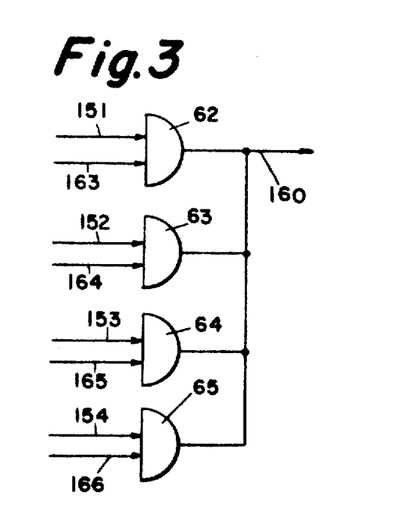
FIG. 3 is a more detailed block diagram of a multiplexer of the type shown in FIG. 1.

FIG. 3 is a detailed diagram of multiplexer 22, multiplexer 23 being similarly arranged. The primary data sensors $P_1$, $P_2$, $P_3$, and $P_4$ are continuously productive of output signals which are applied to the conventional analog gates 62, 63, 64, and 65 over lines 151, 152, 153, and 154 respectively. Control or word pulses $X_1$, $X_2$, $X_3$, and $X_4$ from the logic and drive unit 40 are also applied to the respective analog gates over lines 163, 164, 165, and 166 respectively. The simultaneous application of a data signal and a control pulse to a given gate will enable that gate to pass the applied analog signal to analog-to-digital converter 24 over line 160. Sampling of the applied analog signals is thus effected by selectively and sequentially applying the word pulses $X_1$, $X_2$, $X_3$, and $X_4$, as shown in FIG. 2a, to the respective analog gates so as to control the periodic and sequential application of the primary data signals to multiplexer output line 160.

Figure 3A:
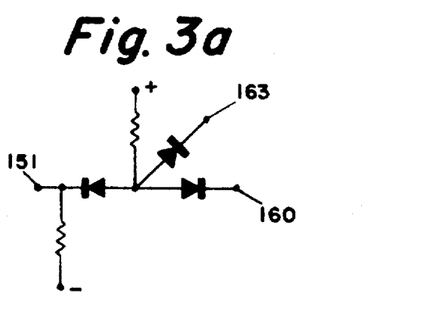
FIG. 3a represents schematically a detail of FIG. 3.

FIG. 3a represents schematically the circuit diagram of analog gate 62, and is representative of the detailed circuitry of all of the analog gates.

Figure 4:
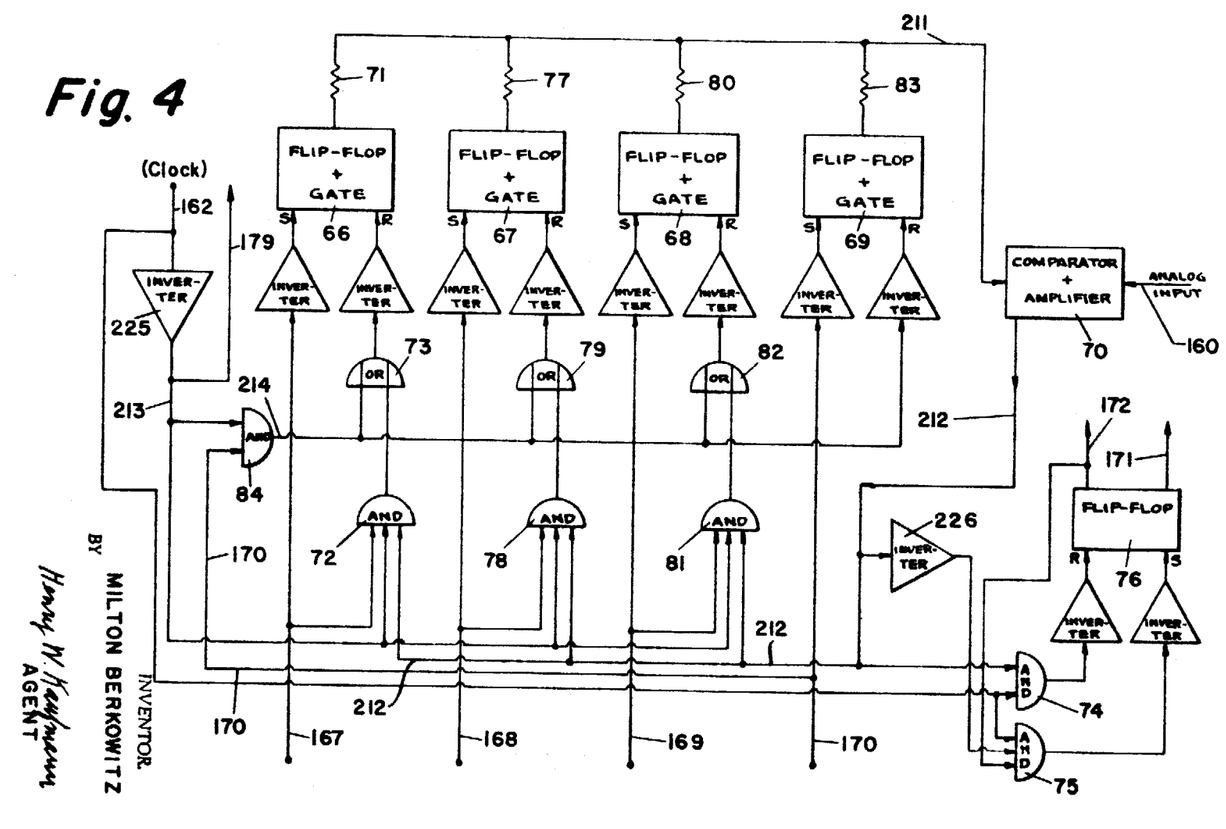
FIG. 4 is a detailed block diagram of an analog to digital converter which may be utilized in the data sampling system of FIG. 1.

FIG. 4 illustrates the primary data analog-to-digital converter 24 utilized in the data-sampling system of the invention. Converter 25 in the secondary data channel is identical. The converter serves to digitally code an analog signal from a data sensor by sequentially comparing the applied analog voltage with a series of voltages generated in the converter, the result of the comparison being employed to produce a four bit digital representation of the applied analog signal, termed a word. The converter comparison voltages are generated by four flip-flop-plus-gate units 66, 67, 68, and 69, and are applied to conventional comparator-plus-amplifier unit 70 over line 211, simultaneously with the application of a primary analog signal to unit 70 from multiplexer 22 over line 160. The comparator-plus-amplifier unit 70 produces an output on line 212 when the generated signal is greater than the applied analog signal. The comparator-plus-amplifier and the flip-flop-plus-gate units are well known in the analog to digital converter art and no specific circuitry is shown.

Initially, flip-flop-plus-gate units 66, 67, 68, and 69 are turned off. Upon application of the analog signal to be encoded to the comparator-plus-amplifier 70 over line 160 from multiplexer 22, flip-flop-plus-gate 66 is turned on by bit pulse $Y_1$ from the logic and drive unit 40 via line 167, and the resultant current flow through associated resistor 71 produces a D.C. voltage of a prescribed value across a resistor in comparator-plus-amplifier 70. In the embodiment shown, the analog data signal on line 160 may vary in the range of zero to five volts and the voltage generated by current from flip-flop plus gate 66, in conjunction with resistor 71, is 2.5 volts. This generated voltage is applied to comparator-plus-amplifier 70 over line 211. If the generated voltage is greater than the analog voltage, comparator-plus-amplifier 70 produces an output signal on line 212. This output signal on line 212 is applied to AND gate 72, associated with flip-flop-plus-gate 66. The clock signal, from clock unit 41, on line 162 is inverted by inverter 225 and applied to AND gate 72 over line 213. Bit pulse $Y_1$, on line 167, is still present, thus enabling AND gate 72 which applies an output to OR gate 73 to turn flip-flop-plus-gate 66 off. The comparator-plus-amplifier output signal on line 212 is also applied to AND gates 74 and (inverted by 226) 75 which control flip-flop 76 to produce a "0" bit on the P-"1" line 171 and a "1" bit on the P-"0" line 172.

Flip-flop-plus-gate 67 is then turned on by bit pulse $Y_2$ from the logic and drive unit 40 on line 168 and draws a current through resistor 77 by which a voltage is produced which is one-half that produced by current through flip-flop-plus-gate 66 and resistor 71, viz 1.25 volts. If this comparison voltage is still larger than the applied analog voltage on line 160, a "0" bit is again applied to the P-"1" output line 171 by flip-flop 76. Flip-flop-plus-gate 67 is turned off by the signals on lines 212, 213 and 168 operating through AND gate 78 and OR gate 79. A similar operation occurs with flip-flop-plus-gate 68, resistor 80, AND gate 81 and OR gate 82. The operation of flip-flop-plus-gate 69, resistor 83 and AND gate 84 is such that flip-flop-plus-gate 69 is turned off upon termination of the $Y_4$ bit pulse on line 170 irrespective of the results of the comparison in comparator plus amplifier 70. This conditions the analog to digital converter for receipt of the next sampled data signal.

If initially the comparison voltage produced is less than the analog voltage, comparator-plus-amplifier 70 produces no output on line 212. Flip-flop 76 is then reset to produce a "1" output on P-"1" line 171 and a "0" bit on P-"0" line 172. In addition, flip-flop-plus-gate 66 is not reset but remains on because there is no feed back pulse on line 212. Upon application of bit pulse $Y_2$ from logic and drive unit 40 on line 168 to flip-flop-plus-gate 67, the current generated thereby is added to the current generated by flip-flop-plus-gate 66 and the sum is applied to comparator-plus-amplifier 70 over line 211. A similar operation occurs with flip-flop-plus-gate units 68 and 69, the output of comparator-plus-amplifier 70 on line 212 controlling the binary output on lines 171 and 172 and the state of the flip-flop-plus-gate units. In this manner the analog data voltage applied to comparator-plus-amplifier 70 on line 160 from multiplexer 22 is approached by the generated voltage applied to line 211, the output on line 212 serving to control the state of flip-flop 76 to properly encode the analog signal by application of appropriate bits to lines 171 and 172. Upon termination of the $Y_4$ bit pulse on line 170, flip-flop-plus-gate units 66, 67, 68, and 69 are turned off by virtue of the signal applied to line 214 by AND gate 84. The inputs to AND gate 84 are an inverted clock pulse on line 213 and a $Y_4$ bit pulse on line 170. The inverted clock output on line 179, connected to line 213, is applied to the one-word delay unit 28 to control the operation thereof, as will be described with reference to FIG. 6.

Figure 5:
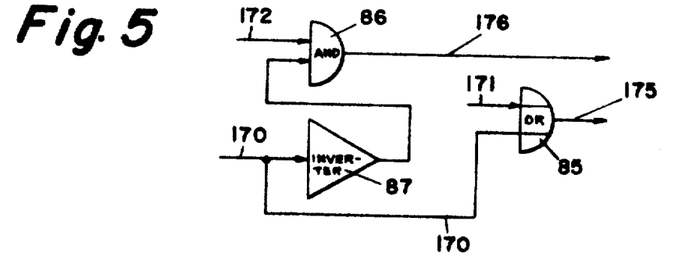
FIG. 5 is a detailed block diagram of the fourth-bit-"one" unit of the system of FIG. 1.

FIG. 5 shows in detail the fourth-bit-a-"one" unit 26. As previously described, this unit modifies the four-bit digital data signal output of analog-to-digital converter 24 in order to identify the signal as a primary data signal, in contradistinction to a secondary data signal derived from the analog-to-digital converter 25. This identification is effected, in the embodiment shown, by changing the fourth, least significant, bit to a "1" in the primary data channel. The primary digital data signal P-"1" is applied to OR gate 85 over conductor 171 while its complement P-"0" is applied to AND gate 86 over conductor 172, the P-"1" and P-"0" signals being derived from analog-to-digital converter 24. During application of the first three bits of a primary digital data word to unit 26, inverter 87 provides an input to AND gate 86, thereby allowing the P-"0" signal to determine the output of AND gate 86. The control pulse $Y_4$ from the logic and drive unit 40 on line 170 is applied to OR gate 85 during the fourth bit time of the primary digital data word to produce a "1" bit output therefrom irrespective of the presence or absence of a "1" bit in the primary digital data signal and to the inverter 87 to similarly preclude an output from AND gate 86. In this manner, the digital data signal is operated upon so that the fourth bit of a given data word on the P-"1" output line 175 is always a "1" bit, and on the P-"0" output line 176 is always a "0" bit.

Figure 6:
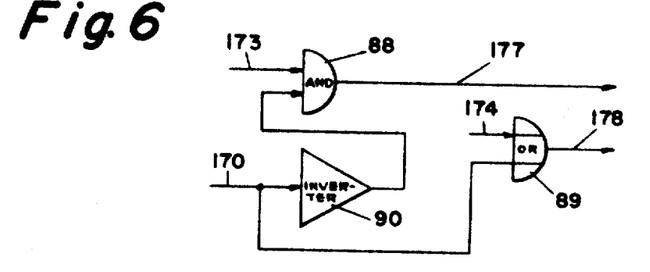
FIG. 6 is a detailed block diagram of the fourth-bit-"zero" unit of the data-sampling system of FIG. 1.

The operation of the fourth-bit-a-zero unit 27, the details of which are shown in FIG. 6 is analagous. The secondary digital data signal S-"1" is applied to AND gate 88 over line 173 while its complement S-"0" is applied to OR gate 89 over line 174, the S-"1" and S-"0" signals being derived from analog-to-digital converter 25. During application of the first three bits of a secondary digital data word to unit 27, inverter 90 provides an input to AND gate 88, thereby allowing the S-"1" signal on line 173 to determine the output of AND gate 88. The control pulse $Y_4$, applied from the logic drive unit 40 over line 170, is applied to OR gate 89 to produce, during the fourth bit time of the secondary digital data word, a "1" bit irrespective of the presence or absence of a "1" bit in the complement of the secondary digital data signal. The bit pulse $Y_4$ is also applied to the inverter 90 to preclude an output from AND gate 88 during the fourth bit time. Thus, the secondary digital data signal is operated upon so that the fourth bit of a given data word on the S-"1" output line 177 is always a "0" bit, and on the S-"0" output line 178 is always a "1" bit.

Figure 7:
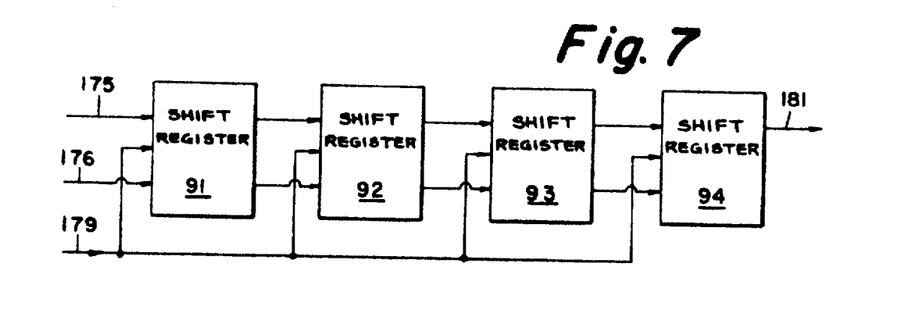
FIG. 7 is a block diagram of the one word delay unit of the system of FIG. 1.

FIG. 7 illustrates the one-word delay unit 28 shown in FIG. 1, unit 29 being identical. The primary digital data signal P-"1" and its complementary signal P-"0" are applied, from fourth-bit-a-"one" unit 26 over lines 175 and 176, to the first of a series of four conventional shift registers 91, 92, 93 and 94. Under control of the inverted clock signal available on line 179 from analog-to-digital converter 24, the four-bit primary digital data signal is shifted through the unit and thereby delayed for one word period, or four milliseconds in the embodiment shown. The delayed primary digital data signal is applied to output gate 30 over line 181. The delay is required for the comparison to be made in comparator 36, shown in FIG. 1. As previously described with reference to FIG. 1, a contemporary primary digital data signal is compared with a primary digital data signal that has been delayed one frame period, i.e., the instantaneous output from a single data sensor is compared with the output during the last sampling of that data sensor. The comparison in comparator 36 is made on a bit by bit basis and no decision is rendered until the last bits of the contemporary and delayed signals have been compared. Thus, the contemporary signal must be delayed until the comparison is completed so that the contemporary primary and secondary digital data signals are applied to the output gate 30 after the decision has been made and the resulting "enable P" or "enable S" signal has been applied to the output gate 30.

Figure 8:
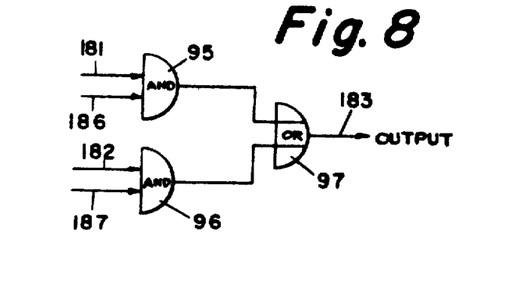
FIG. 8 is a block diagram of the output gate of the system of FIG. 1.

The output gate 30, as shown in FIG. 8, comprises two AND gates 95 and 96 and an OR gate 97. The primary digital data signal P-"1" and the secondary digital data signal S-"1," having been delayed in one word delay units 28 and 29, are applied to AND gates 95 and 96 respectively, over conductors 181 and 182, the other inputs to the AND gates being the "enable P" and "enable S" control signals applied from the comparator 36 over lines 186 and 187 respectively. The AND gate outputs are applied to the OR gate 97, which is connected to transmitter 31 over line 183. Thus, the presence of an "enable P" output from the comparator 36 will allow the primary digital data signal P-"1" to be passed to the transmitter 31 or other utilizing means over conductor 183, while alternately the presence of an "enable S" signal will allow the secondary digital data signal S-"1" to pass.

Figure 9:
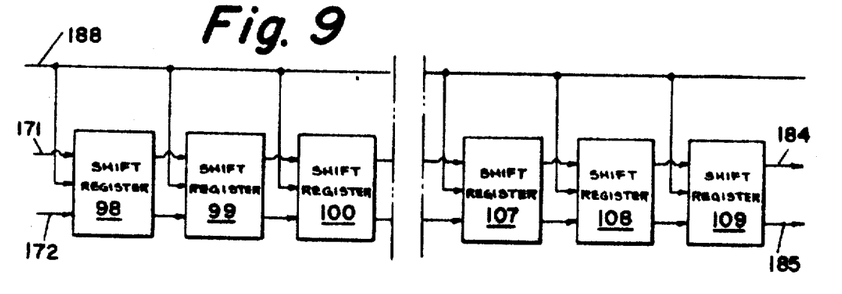
FIG. 9 is a detailed block diagram of the one frame delay unit of the data-sampling system of FIG. 1.

The one-frame delay unit 35 of FIG. 1 is illustrated in detail in FIG. 9. The unit comprises a plurality of serially connected conventional shift registers 98, 99, 100, 101, 102, 103, 104, 105, 106, 107, 108, and 109, units 101-106 inclusive being not represented, for compactness. The primary digital data signal P-"1" and its complementary P-"0" are applied to shift register 98 from analog to digital converter 22 over lines 171 and 172, respectively, and are shifted on a bit by bit basis through the unit under the control of the shift pulses provided by shift pulse generator 37 over line 188. Shift pulses are generated only during the second, third and fourth bit times of each data signal as will be subsequently described in detail in connection with FIG. 11. Thus, the first, most significant, bit of a primary digital data word, which need not be compared in the comparator 36, is automatically eliminated. The reason for the elimination of the first bit will be discussed in the description of FIG. 10. The delay experienced by the data signal is equal to one "frame period," that is the period between samplings of the output of a given primary sensor. Hence, the bits of the delayed data words P-"1" and P-"0" will be applied to the comparator 36 over lines 184 and 185 simultaneously with the application of the corresponding bits of the contemporary data signal, to thereby allow a bit by bit comparison in the comparator.

Figure 10:
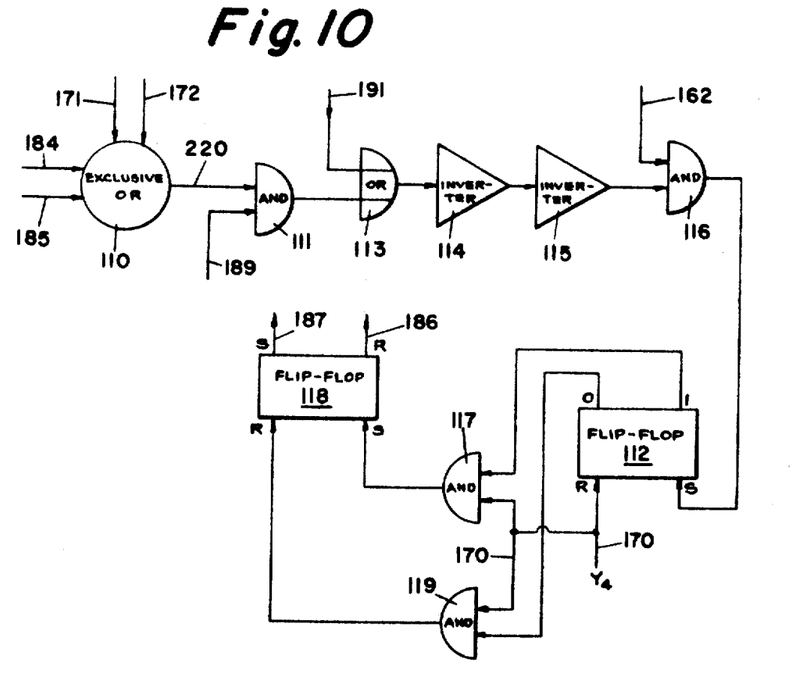
FIG. 10 is a detailed block diagram of the comparator of the system of FIG. 1.

FIG. 10 illustrates the comparator 36 of FIG. 1. The contemporary and delayed primary digital signals, P-"1" and P-"1" delayed, on lines 171 and 184 respectively, and their complementary signals P-"0" and P-"0" delayed, on conductors 172 and 185 respectively, are applied to the exclusive OR gate 110, the circuit of which is shown, and will be specifically described in connection with FIG. 10a. The P-"1" and P-"0" signals are derived from analog-to-digital converter 24 while the P-"1" delayed and P-"0" delayed signals are derived from one-frame delay unit 35. Exclusive OR gate 110 compares the contemporary and delayed signal on a bit by bit basis and generates an output when the corresponding bits are not identical, the output being applied to the AND gate 111 over line 220. Simultaneously, a signal from shift pulse generator 37 is applied to AND gate 111 over line 189, the latter signal comprising pulses of clock width occurring during the second, third, and fourth bit times of the data signal. AND gate 111 is thus not enabled during the first bit time since only the second, third, and fourth bits of a given data word are to be compared. In a data word the first bit is the most significant bit while the fourth is the least significant. In the embodiment shown, a change in the fourth bit represents a change of approximately 6% in the analog signal output of multiplexer 22 while the change in the third bit represents a change of approximately 13%. A change in the second bit represents a change of approximately 26% in a given primary data signal. Thus, if the second, third and fourth bits change, a variation of approximately 45% in the analog signal is indicated. The design of the embodiment illustrated is based on the assumption that a change in data greater than 45% will not occur in one frame period or if it does occur then either the second, third, or fourth bit will change in addition to the first. Comparison of the first bit can be accomplished by appropriate changes in this system which will be evident to those skilled in the art.

Thus, AND gate 111 will provide an output if, during the second, third, or fourth bit times, the corresponding contemporary and delayed bits are different. Assuming that AND gate 111 does provide an output, this output is applied to flip-flop 112 through OR gate 113, inverters 114 and 115, and AND gate 116. Flip-flop 112 then changes its state, applying an input signal to AND gate 117. At bit four time, the $Y_4$ pulse, from logic and drive unit 40, is applied to AND gate 117 over line 170, thereby enabling AND gate 117 to provide an input to flip-flop 118. The state of flip-flop 118 is thus changed and the "enable P" signal is applied to output gate 30 over line 186.

Upon termination of the $Y_4$ pulse, flip-flops 112 and 118 are reset. If during the next primary digital data word, the second, third and fourth bits are identical, AND gate 111 and AND gate 116 will not produce outputs to change the state of flip-flop 112. Hence, AND gate 117 will produce no output. However, flip-flop 112, having been reset, will provide an output to AND gate 119 which is enabled at bit fourth time by bit pulse $Y_4$ on line 170 to change the state of flip-flop 118, thereby producing the "enable S" signal on line 187. As previously described, the secondary data is then transmitted, while the primary data is blocked. This condition continues until AND gate 111 again provides an output signal due to detection of a difference in the contemporary and delayed bits of a primary digital data word at exclusive OR gate 110. Thus, the secondary data words are normally transmitted subject to interruption by a given primary data word, i.e., the encoded output of a given primary sensor, when the latter undergoes a prescribed change. A decision as to whether the primary or the secondary data word is to be transmitted is made by comparator 36 during the period of each word pulse $X_1$, $X_2$, $X_3$, or $X_4$, i.e. as the output of each sensor is sampled. Thus, after transmission of a primary data word, transmission of the secondary data word is automatically resumed if the next sampled primary sensor output does not reflect the prescribed change.

As previously described, every sixteen frames a "read P" signal is generated by count-sixteen-frames unit 38 and applied to OR gate 113 over line 191 in order to transmit one frame of primary data. The "read P" signal has a duration of one "frame period" and hence the "enable P" signal is generated for that period, allowing the encoded output of each primary sensor to be transmitted. The clock input to AND gate 116 on line 162 serves to provide the proper width pulses to flip-flop 112.

Figure 10A:
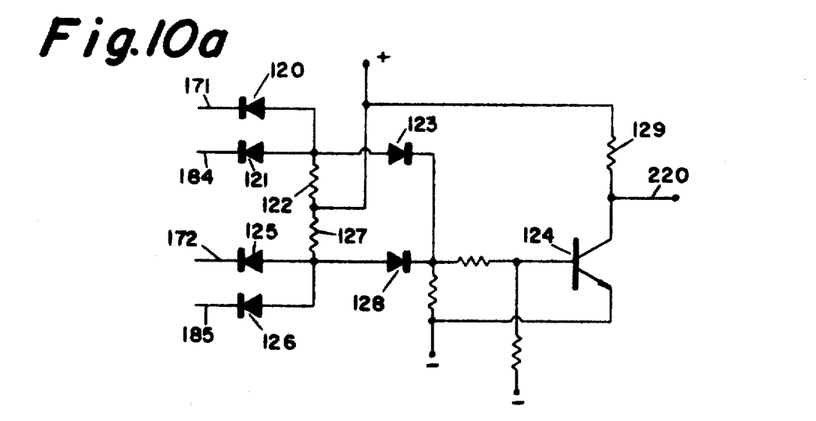
FIG. 10a is a circuit diagram of the exclusive OR gate of the comparator of FIG. 9.

FIG. 10a illustrates an exclusive OR gate which can be used as the exclusive OR gate 110 of the delta-comparator 36 shown in FIG. 10. The P-"1" and P-"1" delayed signals are applied over lines 171 and 184, as previously described, to an AND gate comprising diodes 120, 121 and resistor 122. If the P-"1" and P-"1" delayed signals are both "1," the AND gate produces a signal which is applied through diode 123 to the base of transistor 124, saturating the transistor and producing no output on line 220. Similarly, if both the P-"1" and P-"1" delayed signals are "0" bits, the complementary P-"0" and P-"0" delayed signals, applied over lines 172 and 185 as previously described, enable the AND gate comprising diodes 125, 126 and resistor 127 to bias transistor 124 to saturation through diode 128. However, if P-"1" is a "1" bit and P-"1" delayed is a "0" bit, or vice versa, the AND gates are not enabled and transistor 124 is rendered non-conductive, thereby reducing the voltage drop across resistor 129 and producing an output pulse on line 220. The output on line 220 is applied to AND gate 111 of the delta-comparator 36 as described in connection with FIG. 10.

Figure 11:
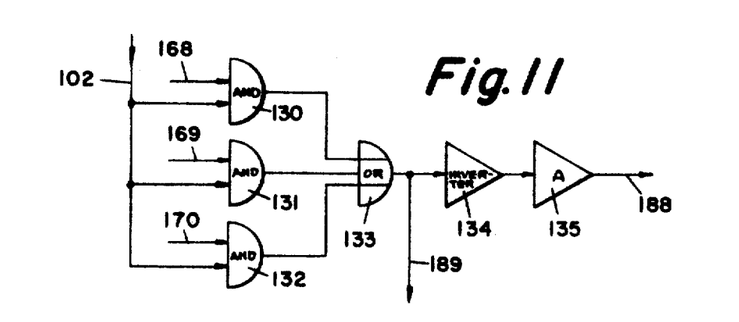
FIG. 11 is a block diagram illustrating in detail the shift pulse generator of the data-sampling system of FIG. 1.

The shift pulse generator 37, shown in detail in FIG. 11 comprises three AND gates 130, 131 and 132, OR gate 133, inverter 134 and an emitter-follower 135, which serves as a buffer. The AND gates, receiving an input signal from clock 41 via line 10c and bit pulses $Y_2$, $Y_3$, and $Y_4$ from logic and drive unit 40 over lines 168, 169, and 170, are productive of output pulses of clock width occurring during the second, third, and fourth bit times. These output pulses are applied over line 189 to control comparator 36. The same pulses are inverted in inverter 134 and applied through the emitter-follower 135 to the one frame delay unit 35 over line 188.

Figure 12:
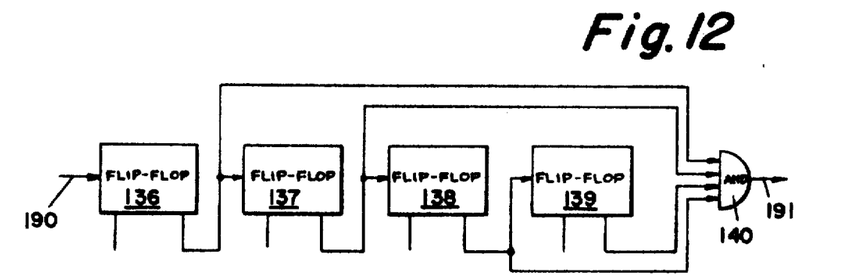
FIG. 12 is a block diagram of the count-sixteen-frames unit of the system of FIG. 1.

The count-sixteen-frames unit 38, shown in detail in FIG. 12, comprises a plurality of conventional flip-flops 136, 137, 138 and 139 and an AND gate 140 and operates as a pulse counting circuit. Logic and drive unit 40 provides, over line 190, a frame rate signal occurring once every sixteen clock pulses, which is applied to flip-flop 136. The series of flip-flops serves to count the frame rate signals on line 190, flip-flop 139 producing an output, which is applied to AND gate 140, every sixteen frame periods. The output of each flip-flop 136, 137, and 138 is also applied to AND gate 140, thereby enabling AND gate 140 every sixteen "frame periods" for a duration of one frame period. The resulting "read P" signal on output line 191 is applied to comparator 36 to condition the output gate 30 to pass the primary data signals for a frame period.

Although the invention and its operation has been described with reference to a specific embodiment, the invention is not limited to this embodiment. Many modifications within the spirit and scope of the invention will be obvious to those skilled in the art. For example, the number of data groups or channels may be varied simply by corresponding alteration of the comparison and gating functions. Similarly, the system is not limited to digital data signals. Nor is the data-sampling system of the invention limited to use with a radio telemetry system since other utilizing means are also appropriate. It is thus intended that the invention be not limited to the particular details shown and described which may be varied without departing from the spirit and scope of the invention and the appended claims.

I claim:
1. In a data-sampling system,
   (a) a timing means,
   (b) a first source of digital data signals,
   (c) a second source of digital data signals,
   (d) each of said sources comprising,
      (1) a plurality of transducers,
      (2) an analog to digital converter, and
      (3) a multiplexer means connected to said timing means and to said transducers and said converter and controlled by said timing means to periodically and sequentially apply the output signals of said transducers to said converter,
   (e) a data signal utilizing means,
   (f) a selective gating means connected to said first and second sources and operative to normally connect said second source to said utilizing means,
   (g) comparator and storage means connected to said first source and to said gating means to detect a change in the data signal output of said first source from the value thereof last transmitted to said utilizing means by said selective gating means and to control said gating means so as to disconnect said second source from said utilizing means and connect said first source to said utilizing means when a detected said change in the data signal output of said first source exceeds a predetermined amount, and (h) control signal generating means connected to said timing means and to said comparator means and adapted to cause the comparator means to control said gating means to periodically disconnect said second source and connect said first source to said utilizing means.

2. In a data-sampling system,
(a) a first source of primary analog data signals comprising a plurality of sensors,
(b) a second source of secondary analog data signals comprising a plurality of sensors,
(c) a first analog to digital converter,
(d) a second analog to digital converter,
(e) a first gating means connected between said first source and said first analog to digital converter,
(f) a second gating means connected between said second source and said second analog to digital converter,
(g) a control means,
(h) means for connecting said control means to said first and second gating means so as to control the periodic and sequential application of the primary and secondary analog data signals to said first and second analog to digital converters respectively,
(i) means for connecting said control means to said first and second analog to digital converters so as to control the operation of said first and second analog to digital converters in producing digital representations of said primary analog data signals and said secondary analog data signals,
(j) a third gating means,
(k) means connecting said first analog to digital converter to said third gating means,
(l) means connecting said second analog to digital converter to said third gating means,
(m) a data signal utilizing means,
(n) means for connecting said utilizing means to said third gating means,
(o) sensing means operative to produce a first enable signal when a prescribed difference is sensed between two consecutive data signals from a given primary data sensor and operative to produce a second enable signal when said consecutive analog data signals from a given primary data sensor fail to indicate the prescribed change,
(p) means for applying the output of said first analog to digital converter to said sensing means, and
(q) means connecting said sensing means to said third gating means to apply either said first enable signal or said second enable signal to said third gating means to control said third gating means to pass the primary data signal to said utilizing means in response to said first enable signal and to pass said secondary data signal to said utilizing means in response to said second enable signal.

3. The system of claim 2 in which the means connecting said first analog to digital converter to said third gating means includes an identification unit operative to modify the data signals from said first analog to digital converter to include an identifying characteristic.

4. The system of claim 2 in which the means connecting said second analog to digital converter to said third gating means includes an identification unit which modifies the data signals from said second analog to digital converter to include an identifying characteristic.

5. The system of claim 2 in which the means connecting said first analog to digital converter to said third gating means includes a storage unit operative to delay a data signal from said first analog to digital converter for a prescribed period, and in which the means connecting said second analog to digital converter to said third gating means includes a storage unit operative to delay a data signal from said second analog to digital converter for a prescribed period.

6. A system of claim 2 in which said sensing means comprises
(1) a comparator means,
(2) storage means for delaying an applied signal for a predetermined period, and
(3) means for connecting said storage means to said comparator means so as to connect said delayed signal output of a given primary data sensor to said comparator means simultaneously with the connection thereto of a contemporary data signal of the same primary data sensor from said first analog to digital converter.

7. A system of claim 2 wherein a counting means is connected to said control means and to said sensing means and is operative periodically and for a prescribed period to connect the first enable signal to said third gating means in order to connect primary data signals from said first source to said utilizing means irrespective of change in the primary data signals.

8. A data-sampling system comprising:
(a) a source of timing pulses;
(b) a first source of a first plurality of data signals, connected to emit synchronously with the said timing pulses and in repeated periodic fixed sequence the data signals of the said first plurality;
(c) delay means connected to receive the data signals emitted by the said first source, to delay the said data signals for one period of the said sequence, and to emit to a comparator the signals thus delayed;
(d) a comparator connected to receive the undelayed data signals emitted by the said first source and the delayed data signals emitted by the said delay means, and to emit responsively thereto signals significant of the magnitude of the inequality between the undelayed and the delayed data signals;
(e) a second source of a second plurality of data signals, connected to emit synchronously with the said timing pulses and in repeated periodic fixed sequence the data signals of the said second plurality;
(f) storage means to store each data signal emitted by the said first source until the emission by the said comparator of a said signal significant of the magnitude of the difference between the said data signal and a data signal delayed by one period produces a response in a gating means;
(g) gating means connected to receive the data signals emitted by the said first source and stored by said first storage means, and to receive the data signals emitted by the said second source, and connected to receive the significant signals emitted by the comparator; and, responsively to the said significant signals, to emit to utilization means the said data signals emitted by the said first source when the said significant signals are significant of inequality greater than a predetermined magnitude and to emit to the said utilization means the said signals emitted by the said second source when the said significant signals are significant of inequality less than a predetermined magnitude;
(h) utilization means to receive signals emitted by the said gating means.

References Cited by the Examiner
UNITED STATES PATENTS

| 1,873,785 | 8/1932 | Ranger | 340—147 |
| 2,220,883 | 11/1940 | Bergereet et al. | 179—4 |
| 2,279,295 | 4/1942 | Blanton | 340—147 |

(Other references on following page)

UNITED STATES PATENTS

| | | | |
|---|---|---|---|
| 2,614,237 | 10/1952 | Goertz | 340—187 |
| 2,729,741 | 1/1956 | Chapman | 328—137 |
| 2,766,378 | 10/1956 | Sundin | 328—154 |
| 2,871,289 | 1/1959 | Cox et al. | 340—149 X |
| 2,946,044 | 7/1960 | Bolgiano et al. | 340—147 |
| 3,088,098 | 4/1963 | Moore | 340—150 |
| 3,173,127 | 3/1965 | Brunner | 340—147 |
| 3,199,081 | 8/1965 | Kok et al. | 340—147 |

NEIL C. READ, *Primary Examiner.*

L. A. HOFFMAN, P. XIARHOS, *Assistant Examiners.*